(12) United States Patent
Legresy

(10) Patent No.: US 10,703,570 B2
(45) Date of Patent: Jul. 7, 2020

(54) METHOD FOR MANUFACTURING AN ENDLESS BELT, OF THE FLAT TYPE MADE OF METAL MATERIAL

(71) Applicant: ARDAGH MP GROUP NETHERLANDS B.V., Deventer (NL)

(72) Inventor: Jean-Marc Legresy, La Fleche (FR)

(73) Assignee: Trivium Packaging Group Netherlands B.V., Deventer (NL)

( * ) Notice: Subject to any disclaimer, the term of this patent is extended or adjusted under 35 U.S.C. 154(b) by 0 days.

(21) Appl. No.: 16/345,546

(22) PCT Filed: Oct. 26, 2017

(86) PCT No.: PCT/EP2017/077436
§ 371 (c)(1),
(2) Date: Apr. 26, 2019

(87) PCT Pub. No.: WO2018/078012
PCT Pub. Date: May 3, 2018

(65) Prior Publication Data
US 2019/0270592 A1 Sep. 5, 2019

(30) Foreign Application Priority Data
Oct. 28, 2016 (FR) ...................... 16 60535

(51) Int. Cl.
*B65G 15/48* (2006.01)
*B65G 23/06* (2006.01)
(Continued)

(52) U.S. Cl.
CPC .............. *B65G 15/48* (2013.01); *B21D 53/14* (2013.01); *F16G 1/20* (2013.01); *F16G 3/10* (2013.01); *B65G 23/06* (2013.01)

(58) Field of Classification Search
None
See application file for complete search history.

(56) References Cited

U.S. PATENT DOCUMENTS

| 3,121,660 A | 2/1964 | Hall, Jr. |
| 5,259,496 A | 11/1993 | Common |
| (Continued) | | |

FOREIGN PATENT DOCUMENTS

| BE | 674963 A | 7/1966 |
| GB | 1025000 A | 4/1966 |
| WO | 00/61357 A2 | 10/2000 |

OTHER PUBLICATIONS

International Search Report, dated Jan. 25, 2018, from corresponding PCT application No. PCT/EP2017/077436.

*Primary Examiner* — Kavel Singh
(74) *Attorney, Agent, or Firm* — Young & Thompson

(57) ABSTRACT

Disclosed is a method for manufacturing an endless belt, of the flat type made of metal material, designed to be wound around at least one indexed pulley provided with teeth. The endless belt includes, for the one part, locations which are each designed to receive a product to be conveyed and, for the other part, indexing perforations. The manufacturing method includes the following successive steps: a) a step of supplying a flat band made of the metal material, b) a step of closing the band by welding of the transverse edges thereof via a weld seam, and c) a step of perforating the weld seam, at the at least one longitudinal indexing line, in order to form at least one additional indexing perforation that is also designed to engage with the teeth of the at least one indexed pulley.

19 Claims, 2 Drawing Sheets

(51) Int. Cl.
*B21D 53/14* (2006.01)
*F16G 3/10* (2006.01)
*F16G 1/20* (2006.01)

(56) References Cited

U.S. PATENT DOCUMENTS

| | | | | |
|---|---|---|---|---|
| 5,342,250 | A | * | 8/1994 | Sanders .............. B29C 65/7802 156/137 |
| 6,070,713 | A | * | 6/2000 | Eichmann .............. B21D 43/12 198/834 |
| 6,148,496 | A | | 11/2000 | McGuire et al. |

* cited by examiner

METHOD FOR MANUFACTURING AN ENDLESS BELT, OF THE FLAT TYPE MADE OF METAL MATERIAL

TECHNICAL FIELD TO WHICH THE INVENTION RELATES

The present invention generally relates to the field of endless belts, of the plate type and made of metallic material, adapted to be rolled around indexed pulleys.

It more particularly relates to a method for manufacturing such endless belts, as well as to the endless belts issued from this method.

TECHNOLOGICAL BACK-GROUND

The endless belts, of the flat type and made of metallic material, have advantages in the field of conveying, in particular as regards the accuracy and the repetitiveness.

Some of these metallic endless belts are moreover adapted to be rolled around indexed pulleys provided with teeth, to provide the conveyed objects with accurate indexing and positioning.

Such metallic endless belts include for that purpose indexing perforations into which the teeth of the pulleys are intended to be engaged.

These perforated metallic endless belts are for example implemented in machines for manufacturing metal lids intended to be crimped onto a metal can body, advantageously the easy-opening lids.

The manufacturing of such a perforated metallic endless belt is made from a metal strip ended by two transverse edges intended to be welded to each other.

These two transverse edges may each include two rectilinear portions separated by a notch intended to form a part of an indexing perforation located at the welding line.

The assembly of these two transverse edges then requires making a discontinuous welding line, interrupted at the associated notches that form together one of the indexing perforations.

Now, the welding line issued from this technique of assembly, and in particular the end of the welding bead located at the indexing perforation, constitutes a zone of fragility for this perforated metallic endless belt.

Moreover, the indexing perforation issued from the associated notches is liable to have an irregular contour, in particular due to problems of accurate adjustment of the transverse edges relative to each other and of potential offsets between the notches.

There hence exist a need for a technique for manufacturing a perforated metallic endless belt, whose welding line would be more resistant.

OBJECT OF THE INVENTION

In order to remedy the above-mentioned drawback of the state of the art, the present invention proposes a new method for manufacturing an endless belt, of the flat type and made of metallic material, adapted to be rolled about at least one indexed pulley provided with teeth.

More particularly, the invention relates to a method for manufacturing such an endless belt, delimited by two longitudinal edges.

The endless belt includes, on the one hand, places that are each adapted to receive a product to be conveyed, for example a metal lid intended to be crimped onto a metal can body, advantageously an easy-opening lid, and on the other hand, indexing perforations.

The indexing perforations are distributed along at least one longitudinal indexing line extending parallel to said longitudinal edges, to receive the teeth carried by said at least one indexed pulley.

The manufacturing method comprises the following successive steps:

a) a step of providing a flat strip, made of said metallic material, wherein said strip has a parallelogram-shaped contour that is delimited by two longitudinal edges and by two transverse edges, b) a step of closing said strip by welding said transverse edges with each other, through a welding line, to obtain said endless belt.

The manufacturing method comprises, after said closing step, c) a step of perforating said welding line, at said at least one longitudinal indexing line, to form at least one additional indexing perforation also adapted to cooperate with the teeth of said at least one indexed pulley.

Other non-limitative and advantageous features of the method according to the invention, taken individually or according to all the technically possible combinations, are the following:

the transverse edges of the strip are rectilinear;

during the provision step a), the strip includes the places and the indexing perforations, except said at least one additional indexing perforation;

the places are advantageously arranged along at least two longitudinal lines extending parallel to said longitudinal edges; the transverse edges extend advantageously parallel to a transverse line passing through at least two places transversely juxtaposed to each other;

the perforation step consists in a step of mechanical perforation or a step of impact-less perforation;

said at least one longitudinal indexing line may be located at equal distance from the longitudinal edges of the strip;

the indexing perforations are regularly distributed along said at least one longitudinal indexing line, with a spacing of length d; the strip comprises two terminal indexing perforations that are each located near one of the transverse edges; and the distance between said terminal indexing perforation and said near transverse edge is equal to said length d;

said method comprises, previously to the closing step b), a step of rolling the strip around the pulleys; the closing step b) and the perforation step c) are implemented on the strip rolled around the pulleys;

the dimension of the places is greater than the dimension of the indexing perforations.

The invention also proposes an endless belt, of the plate type and made of metallic material, issued from the manufacturing method according to the invention.

This endless belt includes a plurality of indexing perforations distributed along at least one longitudinal indexing line; wherein said endless belt includes two transverse edges assembled by a welding line into which is formed at least one additional indexing perforation.

Said welding line is divided into welding line portions by said at least one additional indexing perforation. And the end of each welding line portion, located at said at least one additional indexing perforation, has no weld-end defect.

The invention also proposes a machine, for example a machine for manufacturing metal lids (for example, a progression press), equipped with an endless belt according to the invention.

DETAILED DESCRIPTION OF AN EXEMPLARY EMBODIMENT

The following description, in relation with the appended drawings given by way of non-limitative examples, will permit to well understand in what consists the invention and how it may be made.

Figure 1:
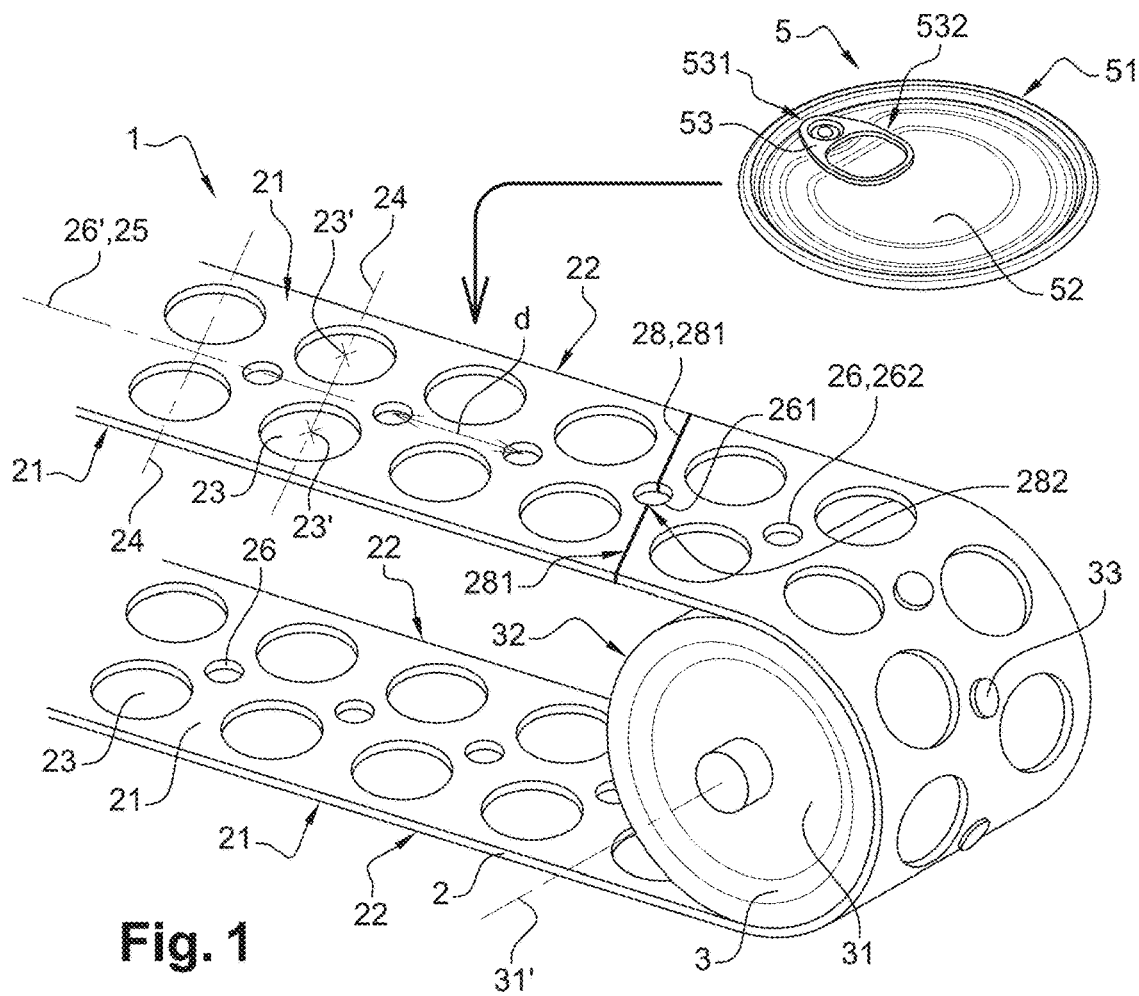
FIG. 1 is a perspective and partial view of a machine equipped with an endless belt according to the invention, which is rolled about an indexed pulley; this FIG. 1 also shows, in insolation and in enlarged view, one of the metal lids intended to be carried by this endless belt.

FIG. 1 represents very schematically and partially a machine 1 equipped with an endless belt 2, which is rolled about a pair of pulleys 3 (only one of the two pulleys is represented here).

The machine 1 consists for example in a machine for manufacturing metal lids 5 intended to be assembled onto metal box bodies.

Metal Lid and Can Body

A metal lid 5 is represented, by way of illustration, in FIG. 1.

A metal lid 5, herein of the easy-opening lid type, comprises two main portions connected by a score line (not visible), i.e.:

a peripheral portion 51, forming a peripheral ring, for the assembly thereof onto the can body, and a central portion 52, forming a removable central closing panel.

The peripheral ring 51 allows the fastening of the metal lid 5, advantageously by crimping, onto a lateral wall of the can body.

The score line is made by thinning of material, obtained using a suitable tool, during the manufacturing of the metal lid 5.

The score line is herein closed/complete (it extends over the whole perimeter of the central closing panel 52); as an alternative, it could be only partial.

The central closing panel 52 is equipped, at its upper surface, with a gripping member 53 whose handling by the user will allow an easy opening of the metal lid 5 (i.e. a separation, total or partial, of the central closing panel 52 from the peripheral ring 51 by breaking of the score line).

This gripping member 53 is generally known from the one skilled in the art as "opening ring".

This opening ring 53 has two portions:

a peripheral portion 531 fastened to the central panel 52, near the score line, including a spout, and an inner portion 532, forming a gripping loop, which is applied against the upper surface of the central closing panel 52.

In practice, this opening ring 53 allows the user to exert a traction on the central closing panel 52, so as to break the score line.

This metal lid 5 has, viewed from above, a generally circular shape; but it could also have a generally non-circular shape, for example rectangular.

Moreover, the metal can body is generally composed of a bottom element associated with the lower edge of a belt of lateral walls (of circular, square, rectangular cross-section, etc.). The connection between the lid and the can body is generally made by a crimping technique.

This metal lid 5 is advantageously made single-piece, with the opening ring added thereon, by metal working techniques described hereinafter.

Machine 1

In the present case, the machine 1 advantageously comprises a set of means for metal working, intended to perform the steps of manufacturing the metal lids 5 from a metal sheet (aluminium, steel, etc.), coated or not, moved by the endless belt 2.

The machine 1 also includes in particular forming means.

But, generally, the endless belt 2 could equip any other desired machine, in which the objects (other than metal lids 5) must be transported in an indexed manner and with an accurate positioning.

Pulleys

The machine 1 includes pulleys 3 cooperating with the endless belt 2.

The pulleys 3 are advantageously two in number, arranged parallel and remote from each other (only one of the two pulleys is shown in FIG. 1).

Each pulley 3 advantageously comprises a drum 31 that is adapted to turn/rotate about an axis of rotation 31' and that has a cylindrical surface 32 about which the endless belt 2 is rolled.

In particular, the pulley 3 represented in FIG. 1 consists in an indexed pulley.

The cylindrical surface 32 of this indexed pulley 3 then includes a set of teeth 33 that are regularly distributed over the circumference thereof and in a same plane perpendicular to the axis of rotation 31'.

As an alternative, not shown, the cylindrical surface 32 of the indexed pulley 3 includes teeth 33 that are distributed in at least two planes perpendicular to the axis of rotation 31'.

Endless Belt

The endless belt 2 is of the flat type and made of metal material, adapted to be rolled around pulleys 3 of the machine 1, at least one of which is an indexed pulley 3.

Advantageously, the "metal material" includes stainless steel.

This endless belt 2 is flexible in that it is adapted to undergo a phenomenon of bending deformation about the pulleys 3.

In particular, this endless belt 2 has:

two opposite surfaces 21, smooth and parallel to each other, providing the flat character thereof, and two longitudinal edges 22, delimiting the opposite surfaces 21.

The distance between these opposite surfaces 21, corresponding to the thickness of the endless belt 2, is advantageously comprised between 0.2 and 0.7 mm, preferably 0.5 mm.

This endless belt 2 includes places 23 that are each adapted to receive a product to be carried, herein a preform made of metallic material for manufacturing a metal lid 5 intended to be crimped onto a metal can body.

Each place 23 is herein in the form of a through-orifice, that is open at the two opposite surfaces 21.

The dimension C1 of a place 23 is adjusted to receive a product to be carried (for example, one of the preforms transformed into a metal lid 5).

The places 23 are herein represented as circles, but they may have any other perimeter adapted to the product to be carried.

The places 23 are juxtaposed to each other in the transverse direction (along the width of the endless belt 2) and in the longitudinal direction (along the length of the endless belt 2).

The places 23 are herein distributed along two longitudinal lines, extending parallel to the two longitudinal edges 22. As an alternative, the places 23 may be distributed along more than two longitudinal lines, for example three longitudinal lines.

Herein, the places 23 are arranged as a plurality of pairs of places 23 distributed over the length of the endless belt 2.

A transverse line 24 (virtual) passes by the centres 23' of the places 23 transversely juxtaposed to each other.

This transverse line 24 herein forms an angle other than 90° with the longitudinal edges 22.

The places 23 of a pair of places 23 are herein arranged on either side of a longitudinal median line 25 (virtual) that extends parallel and at equal distance from the two longitudinal edges 22.

The endless belt 2 also includes indexing perforations 26, adapted to receive the teeth 33 carried by the indexed pulley 3.

Each indexing perforation 26 is herein in the form of a through-orifice that is open at the two opposite surfaces 21 of the endless belt 2 and whose diameter is adjusted to receive one of the teeth 33.

The dimension C2 of an indexing perforation 26, herein the diameter thereof, is advantageously smaller than the dimension C1 of the places 23.

For example, the dimension C2 of an indexing perforation 26 may be comprised between 5 and 30 mm, still preferably from 12 to 20 mm.

In other words, the dimension C1 of the places 23 is greater than the dimension C2 of the indexing perforations 26.

The indexing perforations 26 are for example regularly distributed along at least one longitudinal indexing line 26' that extends parallel to the longitudinal median line 25.

Herein, the indexing perforations 26 are regularly distributed along a single longitudinal indexing line 26' that is merged with the longitudinal median line 25.

As an alternative, the indexing perforations 26 are distributed along at least two longitudinal indexing lines 26' that extend parallel to the longitudinal median line 25.

The distance between two successive indexing perforations 26 (corresponding to the distance separating their respective centres) may be constant over the length of the endless belt 2.

This distance, also named "spacing", has a length denoted by the referenced in FIG. 1.

One of these indexing perforations 261, hereinafter called "additional indexing perforation", is arranged on a welding line 28 issued from the welding of the two transverse edges of a strip closed onto itself (as described hereinafter in relation with FIGS. 2 to 4).

The welding line 28 extends transversely with respect to the longitudinal median line 25, between the two longitudinal edges 22.

This welding line 28 is hence divided into two welding line portions 281 by the additional indexing perforation 261.

Each welding line portion 281 has an end 282 at the additional indexing perforation 261.

As an alternative, this welding line 28 may be divided into more than two welding line portions 281 by at least two additional indexing perforations 261.

The perimeter of this additional indexing perforation 261 is particular in that this perimeter is advantageously continuous, including at the end 282 of the two welding line portions 281 (without offset at this end 282).

Moreover, the perimeter of this additional indexing perforation 261 and the end 282 of each welding line portion 281 (located at said at least one additional indexing perforation 261) have no weld-end defect.

The welding line 28 has for interest to be particularly resistant, in particular with regard to the conventional welding lines arranged on the perforated endless belts.

Manufacturing Method

Figure 2:
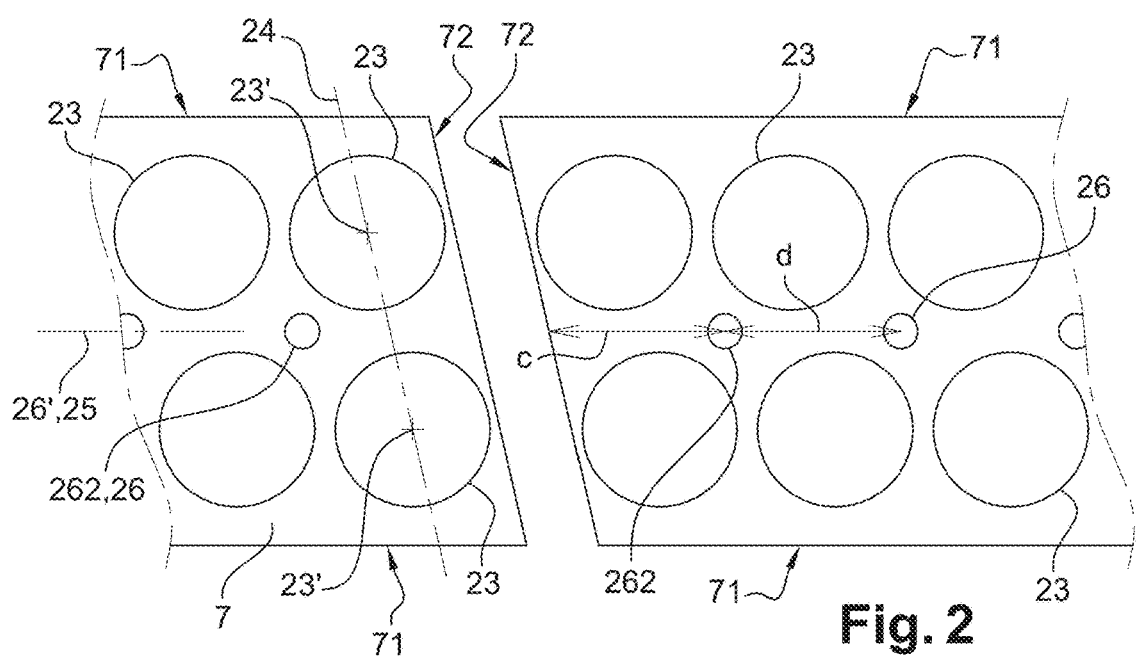
FIGS. 2 to 4 illustrate, in top view, the main steps of the method of the invention for manufacturing the endless belt according to FIG. 1.
Figure 3:
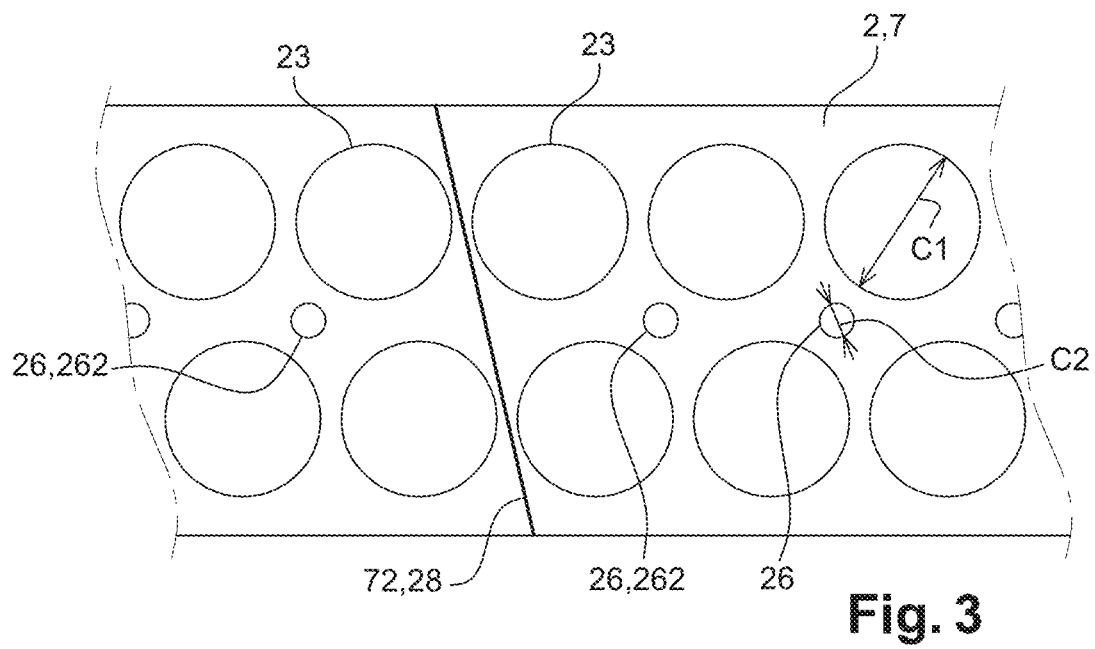
Figure 4:
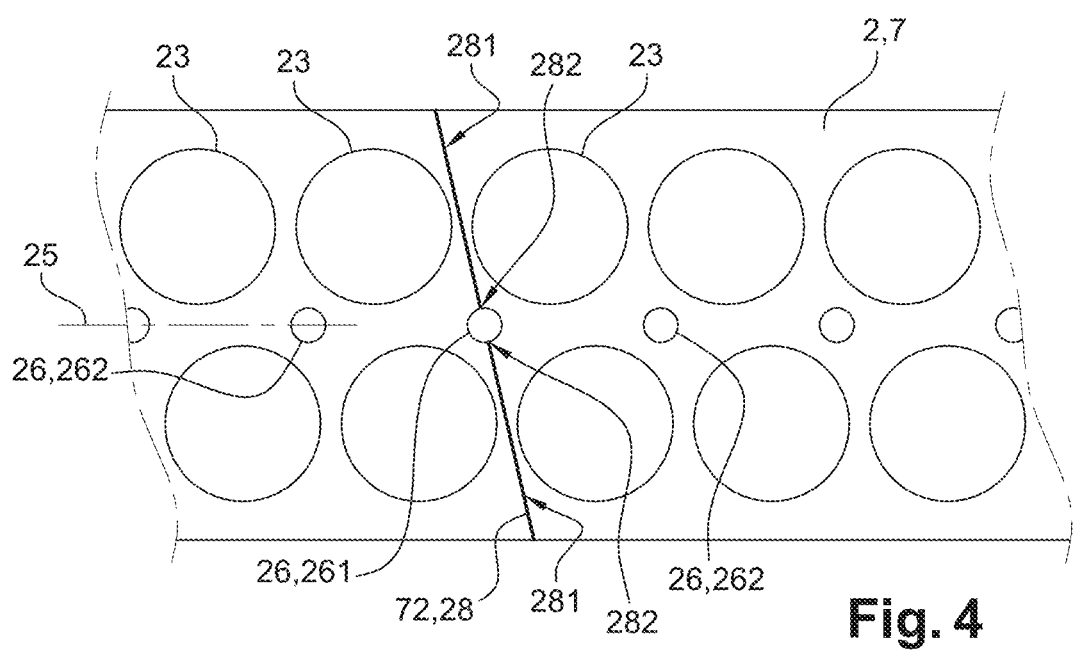

The method for manufacturing the endless belt 2 is schematically illustrated in FIGS. 2 to 4.

The manufacturing method comprises a step of providing a strip 7, flat and made of the metallic material (FIG. 2—step a).

The strip 7 has a parallelogram-shaped contour, which is delimited by two couples of edges:

two longitudinal edges 71, intended to form the longitudinal edges 22 of the endless belt 2, and two transverse edges 72, intended to be assembled by welding to close the endless belt 2.

The two transverse edges 72 are herein rectilinear; they advantageously extend parallel to the transverse line 24 (virtual) that passes through the centres 23' of the places 23 transversely juxtaposed to each other.

This strip 7 already includes the places 23 made for example by a mechanical cutting or an impact-less cutting technique (for example, by water jet).

This strip 7 also includes the indexing perforations 26, except the additional indexing perforation 261 intended to be located at the welding line 28.

The indexing perforations 26 are obtained for example by a mechanical cutting or an impact-less cutting technique.

The indexing perforations 26 are preferably regularly distributed along the longitudinal indexing line 26', with a spacing of length d.

In particular, two terminal indexing perforations 262 are each arranged near one of the transverse edges 72 (FIG. 2).

The distance c between a terminal indexing perforation 262 and the near transverse edge 72 is equal to said above-mentioned spacing length d (FIG. 2).

Preferably, before the closing thereof, the strip 7 is rolled about the pulleys 3 of the machine 1.

The method is continued with a step of closing the strip 7 (step b).

For that purpose, the transverse edges 72 are assembled with each other through the welding line 28 (FIG. 3).

In the present case, the welding line 28 has for interest to form a continuous welding line, extending over the whole length of the associated transverse edges 72 (from one of the two longitudinal edges 71 to the other).

This welding step is for example implemented by the controlled-atmosphere arc welding technique.

Possibly, this step of closing the strip 7 (in particular the welding) is implemented on the strip 7 rolled about the indexed pulleys 3.

After this closing step, the manufacturing method comprises a step of perforating the strip 7 within the welding line 28, so as to form the additional indexing perforation 261 (FIG. 4—step c). As the case may be, the step of perforating the strip 7 is implemented so as to form several additional indexing perforations 261.

The place of this additional indexing perforation 161 is adjusted so as to be located at the point of intersection between the welding line 28 and the longitudinal indexing line 26'.

This perforation step advantageously consists in a step of mechanical perforation or a step of impact-less perforation (for example, by water jet).

As the case may be, this perforation step is implemented on the strip 7 rolled about indexed pulleys 3 (within the machine 1).

At the end of this method, a machine 1 equipped with the endless belt 2 described hereinabove in relation with FIG. 1 is hence obtained.

In particular, the welding line 28 extends transversely with respect to the longitudinal median line 25; this welding line 28 is divided into two welding line portions 281 by the additional indexing perforation 261.

Advantages of the Endless Belt According to the Invention

The endless belt 2 according to the invention has the following advantages with respect to the perforated metallic belts of the prior art:

the end 282 of each welding line portion 281, located at the additional indexing perforation 261, has no weld-end defect, which increases the life duration of the endless belt 2, the perimeter of the additional indexing perforation 261 is continuous and perfectly adjusted.

The invention claimed is:

1. A method for manufacturing an endless belt (2) of flat type, made of metallic material, and adapted to be rolled about at least one indexed pulley (3) provided with teeth (33), said endless belt (2) delimited by two longitudinal edges (22) and including features (23) that are each adapted to receive a product to be conveyed, indexing perforations (26) distributed along at least one longitudinal indexing line (26') extending parallel to said longitudinal edges (22) and configured to receive the teeth (33) carried by said at least one indexed pulley (3), and at least one additional indexing perforation (261) adapted to cooperate with the teeth (33) of said at least one indexed pulley (3), said manufacturing method comprising the following successive steps:

a) a step of providing a flat strip (7), made of said metallic material, said flat strip (7) having a parallelogram-shaped contour that is delimited by two longitudinal edges (71) and by two transverse edges (72), wherein, with said provision step a), said flat strip (7) includes said features (23) that are each adapted to receive the product to be conveyed and said indexing perforations (26) distributed along said at least one longitudinal indexing line (26') extending parallel to said longitudinal edges (22), but not said at least one additional indexing perforation (261);

b) a step of closing said strip (7) by welding said two transverse edges (72) to each other through a welding line (28); and after said closing step b), c) a step of perforating said welding line (28), at said at least one longitudinal indexing line (26'), to form said at least one additional indexing perforation (261).

2. The method for manufacturing an endless belt according to claim 1, wherein the two transverse edges (72) of the provided flat strip (7) are rectilinear.

3. The method for manufacturing an endless belt according to claim 1, wherein the features (23) of the flat strip provided are arranged along at least two longitudinal lines extending parallel to said longitudinal edges (22).

4. The method for manufacturing an endless belt according to claim 1, wherein the transverse edges (72) extend parallel to a transverse line (24) passing through at least two of said features (23) transversely juxtaposed to each other.

5. The method for manufacturing an endless belt according to claim 1, wherein the step of perforating consists in one of a step of mechanical perforation or a step of impact-less perforation.

6. The method for manufacturing an endless belt according to claim 1, wherein said at least one longitudinal indexing line (26') of the flat strip provided is located at equal distances from each of the longitudinal edges (71) of the flat strip (7).

7. The method for manufacturing an endless belt according to claim 1, wherein the indexing perforations (26) are regularly distributed along said at least one longitudinal indexing line (26'), with a spacing length (d), wherein two terminal indexing perforations (262) are each located near one of the transverse edges (72), and wherein a distance (c) between said terminal indexing perforation (262) and said near transverse edge (72) is equal to said spacing length (d).

8. The method for manufacturing an endless belt according to claim 1, further comprising:

prior to the closing step b), a step of rolling the flat strip (7) around the pulleys (3), and wherein the closing step b) and the step of perforating c) are implemented on the strip (7) rolled around the pulleys (3).

9. The method for manufacturing an endless belt according to claim 1, wherein a diameter (C1) of the features (23) is greater than a diameter (C2) of the indexing perforations (26).

10. An endless belt, of the flat type and made of metallic material, issued from a manufacturing method according to claim 1, wherein said endless belt (2) includes a plurality of indexing perforations (26) distributed along at least one longitudinal indexing line (26'), wherein said endless belt (2) includes two transverse edges (72) assembled by a welding line (28) into which is formed at least one additional indexing perforation (261), wherein said welding line (28) is divided into welding line portions (281) by said at least one additional indexing perforation (261), and wherein the end (282) of each welding line portion (281), located at said at least one additional indexing perforation (261), has no weld-end defect.

11. A machine (1) equipped with an endless belt (2) according to claim 10.

12. An endless belt, of the flat type and made of metallic material, issued from a manufacturing method according to claim 2, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

13. An endless belt, of the flat type and made of metallic material, issued from a manufacturing method according to claim 3, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

14. An endless belt, of the flat type and made of metallic material, issued from a manufacturing method according to claim 4, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

15. An endless belt, of the flat type and made of metallic material, issued from a manufacturing method according to claim 5, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

16. An endless belt, of the flat type and made of metallic material, issued from a manufacturing method according to claim 6, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

17. An endless belt, of the flat type and made of metallic material, issued from a manufacturing method according to claim 7, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

18. An endless belt, of the flat type and made of metallic material, issued from a manufacturing method according to claim 8, wherein said endless belt includes a plurality of indexing perforations distributed along at least one longitudinal indexing line, wherein said endless belt includes two transverse edges assembled by a welding line into which is formed at least one additional indexing perforation, wherein said welding line is divided into welding line portions by said at least one additional indexing perforation, and wherein the end of each welding line portion, located at said at least one additional indexing perforation, has no weld-end defect.

19. The method for manufacturing an endless belt according to claim 1, wherein the features (23) are each adapted to receive a metal lid (5) to be crimped onto a metal can body.

* * * * *